United States Patent
Fan et al.

(10) Patent No.: US 12,432,106 B2
(45) Date of Patent: Sep. 30, 2025

(54) CARRIER PHASE TRACKING METHOD AND DEVICE FOR ORTHOGONAL FREQUENCY DIVISION MULTIPLEXING MULTI-CARRIER SYSTEM

(71) Applicant: DATANG MOBILE COMMUNICATIONS EQUIPMENT CO., LTD., Beijing (CN)

(72) Inventors: Shaoshuai Fan, Beijing (CN); Mengfan Zhou, Beijing (CN); Boyang Hu, Beijing (CN); Gang Li, Beijing (CN); Bin Ren, Beijing (CN); Rongyi Fang, Beijing (CN); Zhenyu Zhang, Beijing (CN); Ren Da, Beijing (CN); Shaohui Sun, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 475 days.

(21) Appl. No.: 17/924,686

(22) PCT Filed: Apr. 16, 2021

(86) PCT No.: PCT/CN2021/087694
§ 371 (c)(1),
(2) Date: Nov. 11, 2022

(87) PCT Pub. No.: WO2021/227771
PCT Pub. Date: Nov. 18, 2021

(65) Prior Publication Data
US 2023/0188401 A1    Jun. 15, 2023

(30) Foreign Application Priority Data

May 11, 2020   (CN) .......................... 202010394490.3

(51) Int. Cl.
*H04L 27/26*   (2006.01)

(52) U.S. Cl.
CPC ................................ *H04L 27/2671* (2013.01)

(58) Field of Classification Search
None
See application file for complete search history.

(56) References Cited

U.S. PATENT DOCUMENTS

| 7,251,283 B2 | 7/2007 | Chen |
| 7,782,752 B2 | 8/2010 | G. |

(Continued)

FOREIGN PATENT DOCUMENTS

| CN | 1520669 A | 8/2004 |
| CN | 1802831 A | 7/2006 |

(Continued)

OTHER PUBLICATIONS

Rohde & Schwarz, "Discussion on test point selection for Frequency Error test case in FR2", 3GPP TSG RAN WG5 Meeting #80, Gothenburg, Sweden, Aug. 20-24, 2018, total 3 pages, R5-184962.

(Continued)

*Primary Examiner* — Kodzovi Acolatse
(74) *Attorney, Agent, or Firm* — KILPATRICK TOWNSEND & STOCKTON LLP

(57) ABSTRACT

Provided in the embodiments of the present disclosure are a carrier phase tracking method and device for an orthogonal frequency division multiplexing (OFDM) multi-carrier system. The method includes: performing frequency domain tracking on a received current OFDM symbol and determining a phase of each subcarrier; analyzing a phase curve of all subcarriers and determining an inter-symbol phase average offset, and the inter-symbol phase average offset is used to characterize an estimated value of a difference obtained by subtracting a second value from a first value, the first value is a carrier phase value of the current OFDM symbol, and the second value is an estimated value of a carrier phase of a (Continued)

previous OFDM symbol; and performing time domain tracking by using the inter-symbol phase average offset as an input phase and determining an estimated value of a carrier phase of the current OFDM symbol.

10 Claims, 3 Drawing Sheets

(56) References Cited

U.S. PATENT DOCUMENTS

| | | | |
|---|---|---|---|
| 7,817,736 | B2 | 10/2010 | Gunturi et al. |
| 10,735,983 | B2* | 8/2020 | Yoo ................. H04L 5/0053 |
| 2003/0185147 | A1* | 10/2003 | Taga ............ H04L 27/2647 370/210 |
| 2004/0196915 | A1 | 10/2004 | Gupta |
| 2005/0084025 | A1* | 4/2005 | Chen ............ H04L 27/2695 375/260 |
| 2006/0209979 | A1 | 9/2006 | Sandell et al. |
| 2007/0140212 | A1 | 6/2007 | Gaikwad et al. |
| 2011/0194571 | A1 | 8/2011 | Ozluturk et al. |
| 2012/0321006 | A1* | 12/2012 | Akita ............ H04L 27/2671 375/260 |
| 2017/0347340 | A1* | 11/2017 | Haley ............ H04L 25/03343 |
| 2018/0132122 | A1* | 5/2018 | Yoo ............... H04W 56/0035 |
| 2020/0021470 | A1* | 1/2020 | Sun ................. H04L 25/02 |

FOREIGN PATENT DOCUMENTS

| | | | |
|---|---|---|---|
| CN | 1881823 | A | 12/2006 |
| CN | 1881970 | A | 12/2006 |
| CN | 101132191 | A | 2/2008 |
| CN | 101771656 | A | 7/2010 |
| CN | 101776752 | A | 7/2010 |
| CN | 1881970 | B | 1/2011 |
| CN | 102349248 | A | 2/2012 |
| CN | 102685064 | A | 9/2012 |
| CN | 102349248 | B | 2/2015 |
| CN | 102685064 | B | 2/2015 |
| CN | 104570016 | A | 4/2015 |
| CN | 104931995 | A | 9/2015 |
| CN | 106453187 | A | 2/2017 |
| CN | 109257080 | A | 1/2019 |
| CN | 116455717 | A * | 7/2023 |
| TW | 202010338 | A | 3/2020 |
| WO | 2010038273 | A1 | 4/2010 |

OTHER PUBLICATIONS

Office Action of Corresponding EP Patent Application No. 21805049.0 Dated May 3, 2024.

Hu Liu et al: "A Novel OFDM Synchronization Algorithm", Information Technology and Applications, 2005. ICITA 2005. Third Inter National Conference on Sydney, Australia Jul. 4-7, 2005, Piscataway, NJ, USA, IEEE, vol. 2, Jul. 4, 2005 (Jul. 4, 2005), pp. 249-254, XP010821235.

Office Action of Corresponding TW Patent Application No. 110115009 Dated Apr. 8, 2022.

* cited by examiner

CARRIER PHASE TRACKING METHOD AND DEVICE FOR ORTHOGONAL FREQUENCY DIVISION MULTIPLEXING MULTI-CARRIER SYSTEM

CROSS-REFERENCE TO RELATED APPLICATION

The present disclosure is a US National Stage of International Application No. PCT/CN2021/087694, filed on Apr. 16, 2021, which claims priority to Chinese Application No. 202010394490.3, filed on May 11, 2020, entitled "Carrier Phase Tracking Method and Device for Orthogonal Frequency Division Multiplexing Multi-Carrier System", which are hereby incorporated by reference in their entireties.

FIELD

The present disclosure relates to the field of communication, and in particular, to a carrier phase tracking method and apparatus for an orthogonal frequency division multiplexing (OFDM) multi-carrier system.

BACKGROUND

A carrier phase positioning method is widely used in positioning technology and has a high positioning accuracy. The carrier phase positioning method mainly includes two processes: carrier phase tracking and positioning resolution.

In the related art, the carrier phase positioning method is mainly applied to global navigation satellite system (GNSS). The traditional carrier phase tracking and positioning method is a mature method in the GNSS single carrier system. The premise of realizing this positioning method is that a receiver can effectively and continuously track the carrier phase of a transmitted signal.

When the traditional positioning method is applied to the OFDM multi-carrier system, a frequency error occurs between OFDM received signal and transmitted signal due to the reasons such as deviation of crystal oscillator frequency, Doppler offset and inter-subcarrier interference. A phase offset caused by the frequency error will continue to be accumulated with the increase of the number of subcarriers, which seriously affects the tracking accuracy of the carrier phase and reduces the positioning accuracy.

SUMMARY

Embodiments of the present disclosure provide a carrier phase tracking method and apparatus for an OFDM multi-carrier system, to solve the above problems in the related art.

An embodiment of the present disclosure provides a carrier phase tracking method for an OFDM multi-carrier system, including:
performing frequency domain tracking on a received current OFDM symbol and determining a phase of each subcarrier;
analyzing a phase curve of all subcarriers and determining an inter-symbol phase average offset, where the inter-symbol phase average offset is used to characterize an estimated value of a difference obtained by subtracting a second value from a first value, the first value is a carrier phase value of the current OFDM symbol and the second value is an estimated value of a carrier phase of a previous OFDM symbol; and
performing time domain tracking by using the inter-symbol phase average offset as an input phase and determining an estimated value of a carrier phase of the current OFDM symbol.

In an embodiment, the determining the inter-symbol phase average offset based on the phase curve of all subcarriers, includes:
analyzing the phase curve of all subcarriers in segments and determining a set of estimated values of inter-subcarrier phase change rate;
performing cluster analysis on the set of estimated values of inter-subcarrier phase change rate and determining a category containing the largest number of elements;
averaging elements in the category containing the largest number of elements and determining an inter-subcarrier phase change rate, where the inter-subcarrier phase change rate is used to characterize an estimated value of delay occurring in the current OFDM symbol; and
determining the inter-symbol phase average offset according to the inter-subcarrier phase change rate.

In an embodiment, after determining the estimated value of the carrier phase of the current OFDM symbol, the method further includes:
adaptively adjusting a parameter value of a loop filter in a frequency domain phase locked loop (PLL) according to the estimated value of delay occurring in the current OFDM symbol.

In an embodiment, after determining the estimated value of the carrier phase of the current OFDM symbol, the method further includes:
compensating the estimated value of the carrier phase of the current OFDM symbol according to a first fixed phase gap and a second fixed phase gap, where the first fixed phase gap is a phase gap generated by a frequency domain PLL, and the frequency domain PLL is used to perform frequency domain tracking on a received OFDM symbol; and the second fixed phase gap is a phase gap generated by a time domain PLL, and the time domain PLL is used to perform time domain tracking on an input phase.

In an embodiment, before compensating the estimated value of the carrier phase of the current OFDM symbol according to the first fixed phase gap and the second fixed phase gap, the method further includes:
determining the first fixed phase gap based on a parameter value of the loop filter in the frequency domain PLL, a subcarrier spacing, and the estimated value of delay occurring in the current OFDM symbol; and
determining the second fixed phase gap based on the first fixed phase gap, the inter-symbol phase average offset, and a parameter value of a loop filter in the time domain PLL.

In an embodiment, when the method is applied to an OFDM multi-carrier system in a time division duplex (TDD) mode, after determining the estimated value of the carrier phase of the current OFDM symbol, the method further includes:
compensating the estimated value of the carrier phase of the current OFDM symbol according to an integer ambiguity change, where the integer ambiguity change is a difference obtained by subtracting an integer ambiguity of a previous segment downlink received signal from an integer ambiguity of a current segment downlink received signal, and the current segment downlink received signal is a segment of downlink received signal including the current OFDM symbol.

In an embodiment, before the compensating the estimated value of the carrier phase of the current OFDM symbol according to the integer ambiguity change, the method further includes:
performing linear estimation on a frequency offset of a target uplink transmitted signal based on a frequency offset estimated value of the current segment downlink received signal and a frequency offset estimated value of the previous segment downlink received signal, and determining a frequency offset estimated value of the target uplink transmitted signal, where the target uplink transmitted signal is an uplink transmitted signal at the interval between the current segment downlink received signal and the previous segment downlink received signal; and
determining the integer ambiguity change according to the frequency offset estimated value of the target uplink transmitted signal.

In an embodiment, when the method is applied to the OFDM multi-carrier system in the TDD mode, after determining the estimated value of the carrier phase of the current OFDM symbol, the method further includes:
compensating the estimated value of the carrier phase of the current OFDM symbol according to the first fixed phase gap, the second fixed phase gap and the integer ambiguity change, where the first fixed phase gap is a phase gap generated by the frequency domain PLL, and the frequency domain PLL is used to perform frequency domain tracking on the received OFDM symbol; the second fixed phase gap is a phase gap generated by the time domain PLL, and the time domain PLL is used to perform time domain tracking on the input phase; and the integer ambiguity change is the difference obtained by subtracting the integer ambiguity of the previous segment downlink received signal from the integer ambiguity of the current segment downlink received signal, and the current segment downlink received signal is a segment of downlink received signal including the current OFDM symbol.

An embodiment of the present disclosure further provides a carrier phase tracking apparatus for an OFDM multi-carrier system, including:
a frequency domain phase locked loop (PLL) device, used to perform frequency domain tracking on a received current OFDM symbol and determine a phase of each subcarrier;
an inner-loop analysis device, used to analyze a phase curve of all subcarriers and determine an inter-symbol phase average offset, where the inter-symbol phase average offset is used to characterize an estimated value of a difference obtained by subtracting a second value from a first value, the first value is a carrier phase value of the current OFDM symbol and the second value is an estimated value of a carrier phase of a previous OFDM symbol; and
a time domain PLL device, used to perform time domain tracking by using the inter-symbol phase average offset as an input phase and determine an estimated value of a carrier phase of the current OFDM symbol.

In an embodiment, the inner-loop analysis device includes a segment analysis sub-device, a cluster sub-device, a delay estimation sub-device and a phase offset determination sub-device, where
the segment analysis sub-device is used to analyze the phase curve of all subcarriers in segments and determine a set of estimated values of inter-subcarrier phase change rate;
the cluster sub-device is used to perform cluster analysis on the set of estimated values of inter-subcarrier phase change rate and determine a category containing the largest number of elements;
the delay estimation sub-device is used to average elements in the category containing the largest number of elements and determine an inter-subcarrier phase change rate, where the inter-subcarrier phase change rate is used to characterize an estimated value of delay occurring in the current OFDM symbol; and
the phase offset determination sub-device is used to determine the inter-symbol phase average offset according to the inter-subcarrier phase change rate.

In an embodiment, the apparatus further includes a parameter adjustment device used to adaptively adjust a parameter value of a loop filter in a frequency domain PLL according to the estimated value of delay occurring in the current OFDM symbol.

In an embodiment, the apparatus further includes a first compensation device, where
the first compensation device is used to compensate the estimated value of the carrier phase of the current OFDM symbol according to a first fixed phase gap and a second fixed phase gap, where the first fixed phase gap is a phase gap generated by a frequency domain PLL, and the frequency domain PLL is used to perform frequency domain tracking on a received OFDM symbol; and the second fixed phase gap is a phase gap generated by a time domain PLL, and the time domain PLL is used to perform time domain tracking on an input phase.

In an embodiment, the apparatus further includes a first fixed phase gap determination device and a second fixed phase gap determination device, where,
the first fixed phase gap determination device is used to determine the first fixed phase gap based on a parameter value of a loop filter in the frequency domain PLL, a subcarrier spacing and an estimated value of delay occurring in the current OFDM symbol; and
the second fixed phase gap determination device is used to determine the second fixed phase gap based on the first fixed phase gap, the inter-symbol phase average offset and a parameter value of a loop filter in the time domain PLL.

In an embodiment, when the apparatus applied to an OFDM multi-carrier system under TDD mode, the apparatus further includes a second compensation device, where,
the second compensation device is used to compensate the estimated value of the carrier phase of the current OFDM symbol according to an integer ambiguity change, where the integer ambiguity change is a difference obtained by subtracting an integer ambiguity of a previous segment downlink received signal from an integer ambiguity of a current segment downlink received signal, and the current segment downlink received signal is a segment of downlink received signal including the current OFDM symbol.

In an embodiment, the apparatus further includes an uplink frequency offset estimation device and an integer ambiguity change determination device, where,
the uplink frequency offset estimation device is used to perform linear estimation on a frequency offset of a target uplink transmitted signal based on a frequency offset estimated value of the current segment downlink received signal and a frequency offset estimated value of the previous segment downlink received signal, and determine a frequency offset estimated value of the target uplink transmitted signal, where the target uplink transmitted signal is an uplink transmitted signal at the interval between the current segment downlink received signal and the previous segment downlink received signal; and the integer ambiguity change determination device is used to determine the integer ambiguity change according to the frequency offset estimated value of the target uplink transmitted signal.

In an embodiment, when the apparatus is applied to the OFDM multi-carrier system in TDD mode, the apparatus further includes a third compensation device, where, the third compensation device is used to compensate the estimated value of the carrier phase of the current OFDM symbol according to the first fixed phase gap, the second fixed phase gap and the integer ambiguity change, where the first fixed phase gap is a phase gap generated by the frequency domain PLL, and the frequency domain PLL is used to perform frequency domain tracking on the received OFDM symbol; the second fixed phase gap is a phase gap generated by the time domain PLL, and the time domain PLL is used to perform time domain tracking on the input phase; and the integer ambiguity change is the difference obtained by subtracting an integer ambiguity of a previous segment downlink received signal from an integer ambiguity of a current segment downlink received signal, and the current segment downlink received signal is a segment of downlink received signal including the current OFDM symbol.

An embodiment of the present disclosure further provides an electronic equipment, including: a processor and a memory storing a computer program that is executable on the processor, the computer program, when executed by the processor, causes the processor to perform steps of the above-mentioned method.

An embodiment of the present disclosure further provides a non-transitory computer-readable storage medium having a computer program stored thereon, and the computer program, when executed by a processor, causes the processor to perform the steps of the above-mentioned method.

In the carrier phase tracking method and apparatus for an OFDM multi-carrier system provided by embodiments of the present disclosure, by using a double-loop structure with two nested PLLs, analyzing and adjusting the output result of the frequency domain PLL and inputting the analyzed and adjusted results into the time domain PLL, the phase change of the time domain and the frequency domain can be tracked respectively and the accuracy of carrier phase tracking for OFDM symbols is improved.

DETAILED DESCRIPTION

The embodiments of the present disclosure will be described clearly and completely below with reference to the drawings in the embodiments of the present disclosure. The described embodiments are a part of the embodiments of the present disclosure, rather than all of the embodiments.

Embodiments of the present disclosure are directed to a general OFDM signal model including K subcarriers. The subcarrier spacing is represented as $f_{scs}$, the number of sampling points in one OFDM symbol is N, the length of a cyclic prefix is $N_{CP}$, the length of one OFDM symbol is $N_s$, where $N_s=N+N_{CP}$. Due to the delay caused by propagation path and the sampling clock offset and the frequency offset between a receiver and a transmitter, the signal arriving at the receiver has a frequency offset and a sampling time offset with respect to the transmitted signal. The frequency offset is represented by $\Delta f$ and the sampling time offset is represented by $\Delta t$. A frequency domain data obtained by performing fast Fourier transform (FFT) on the received signal including the above sampling clock offset, frequency offset, and sampling time offset is represented by $c_k^l$ and $c_k^l$ is expressed as follows:

$$c_k^l = e^{j\pi\delta f(N-1)N} e^{-j2\pi(f_c + kf_{scs})\Delta t} \cdot \frac{\sin(\pi\delta f)}{N \sin\left(\frac{\pi\delta f}{N}\right)} H_k^l X_k^l + W_k^l,$$

$c_k^l$ represents the data carried on a kth subcarrier of the lth OFDM symbol after FFT, where k=0, ..., K−1; $\delta f$ represents a normalized frequency offset after normalizing subcarrier spacing, where $\delta f=\Delta f/f_{scs}$; $H_k^l$ represents a channel impulse response; $X_k^l$ is a complex domain data carried on the kth subcarrier of the lth OFDM symbol; and $W_k^l$ is a noise term including a noise and inter-carrier interference.

It can be seen from the expression of $c_k^l$ that a signal carrier phase contains the information of normalized frequency offset $\delta f$ and delay $\Delta t$. Within the same OFDM symbol, the phase offset caused by $\Delta t$ changes linearly with the increase of the number of subcarriers and this phase change is only reflected in frequency domain phase. Between different OFDM symbols, phase change is caused by the combined action of $\delta f$ and $\Delta t$ and this phase change is reflected in time domain phase. Phase-locked loop (PLL) can be used to track the phase change in frequency domain. The linearly changed phase offset corresponds to the inter-subcarrier phase change rate of the phase curve output by the PLL, and then an estimated value of $\Delta t$ can be calculated according to that.

For different symbols, the Doppler frequency offset and transmission delay change caused by user's movement will affect the time domain phase of the signal, which can be tracked by using PLL.

Figure 1:
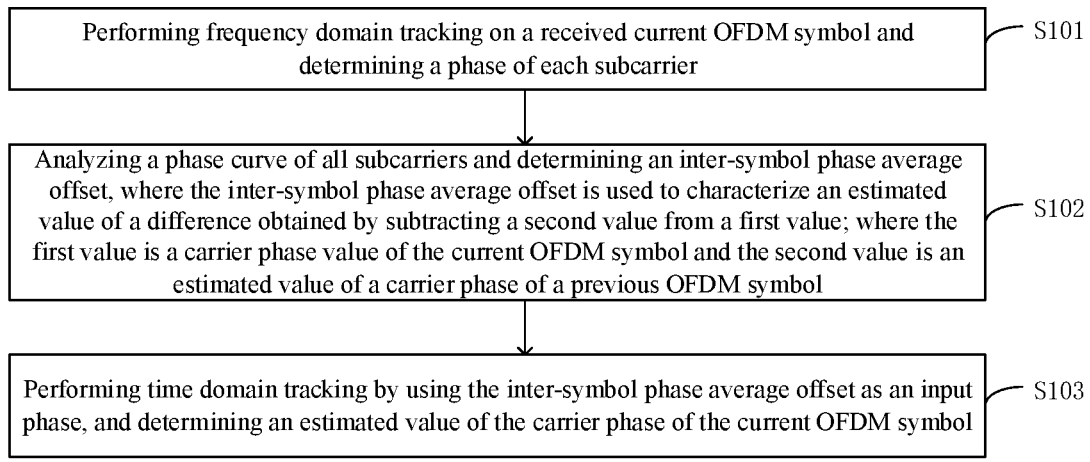
FIG. 1 is a schematic diagram of a carrier phase tracking method for an OFDM multi-carrier system provided by an embodiment of the present disclosure.

FIG. 1 is a schematic diagram of a carrier phase tracking method for an OFDM multi-carrier system provided by an embodiment of the present disclosure. As shown in FIG. 1, an embodiment of the present disclosure provides a carrier phase tracking method for the OFDM multi-carrier system, which is performed by a carrier phase tracking apparatus for OFDM multi-carrier system. The method includes the following steps.

S101: performing frequency domain tracking on a received current OFDM symbol and determining a phase of each subcarrier.

In an embodiment, the carrier phase tracking apparatus for an OFDM multi-carrier system in the embodiments of the present disclosure is used in a receiver for processing a signal to obtain information of a carrier phase. A OFDM symbol arrives at the receiver after passing through a channel, is subjected to down-conversion and time-domain discrete sampling and enters the carrier phase tracking apparatus for OFDM multi-carrier system for performing carrier phase tracking.

Figure 2:
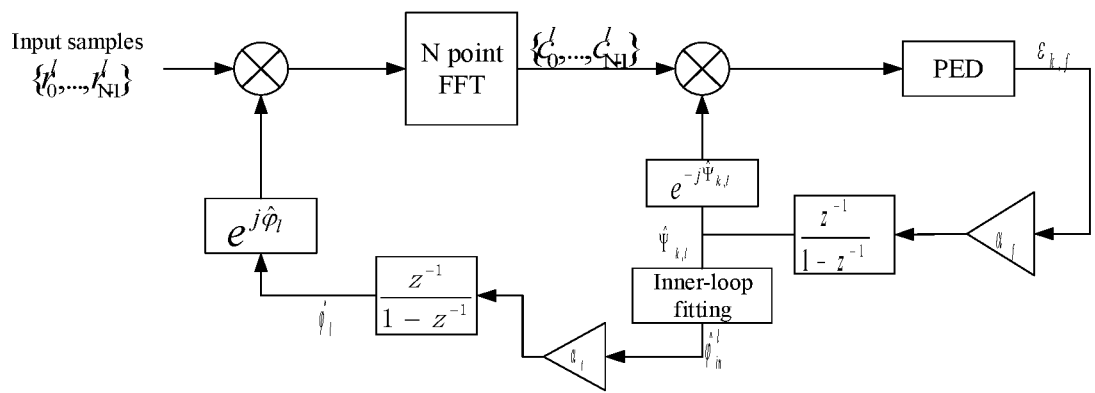
FIG. 2 is a schematic diagram of a carrier phase tracking apparatus for the OFDM multi-carrier system provided by an embodiment of the present disclosure.

FIG. 2 is a schematic diagram of a carrier phase tracking apparatus for an OFDM multi-carrier system provided by an embodiment of the present disclosure. As shown in FIG. 2, the carrier phase tracking apparatus for the OFDM multi-carrier system provided by the embodiment of the present disclosure has a double-loop PLL structure, including a frequency domain PLL device, an inner-loop analysis device and a time domain PLL device.

The frequency domain PLL device is also referred to as an inner-loop PLL, or inner-loop for short, which is used to perform frequency domain tracking on the received lth OFDM symbol and determine the phase of each subcarrier. The frequency domain PLL device includes an inner-loop multiplier, a phase error discriminator (PED), an inner-loop filter and an inner-loop numerical control oscillator (NCO).

After the input sample data $r_i^l$ of the lth OFDM symbol is corrected by the output value of an outer-loop NCO, the corrected input sample data is converted into frequency domain data $c_k^l$ by the FFT operator, and enters the inner-loop PLL. $r_i^l$ represents the ith time domain sampling data in the lth OFDM symbol, where i=0, ..., N−1. $c_k^l$ represents the data carried on the kth subcarrier of the lth OFDM symbol after FFT, where k=0, ..., K−1.

After the frequency domain data $c_k^l$ is corrected by the output value of the inner-loop NCO, the corrected frequency domain data enter the PED. The corrected frequency domain data is processing by PED to output the phase gap $\varepsilon_{k,f}$, where $\varepsilon_{k,f}$ represents the phase gap between the kth subcarrier and the (k−1)th output of the inner-loop NCO, $\varepsilon_{k,f}$ is obtained by conjugate multiplication of the corrected frequency domain data and a known PRS sequence, and $\varepsilon_{k,f}$ remains unchanged when the phase of the inner-loop PLL is locked.

The phase gap $\varepsilon_{k,f}$ enters the inner-loop NCO after passing through the inner-loop filter. The inner-loop NCO outputs subcarrier phase $\hat{\Psi}_{k,l}$, where $\hat{\Psi}_{k,l}$ is obtained by accumulating the outputs of the inner-loop filter corresponding to the previous k subcarriers, and is used to correct the phase of the (k+1)th subcarrier. After the phase of the inner-loop PLL is locked, $\hat{\Psi}_{k,l}$ changes linearly with the increase of the number of subcarriers.

Considering the delay change caused by the propagation environment and user movement, the parameter $\alpha_f$ of the inner-loop filter can be adaptively adjusted during the phase tracking process.

S102: analyzing a phase curve of all subcarriers and determining an inter-symbol phase average offset, where the inter-symbol phase average offset is used to characterize an estimated value of a difference obtained by subtracting a second value from a first value; where the first value is a carrier phase value of the current OFDM symbol and the second value is an estimated value of a carrier phase of a previous OFDM symbol.

In an embodiment, after K frequency domain data of one OFDM symbol are all processed by the frequency domain PLL, the phase output $\hat{\Psi}_l$ corresponding to each subcarrier can be obtained, where $\hat{\Psi}_l = \{\hat{\Psi}_{0,l}, \ldots, \hat{\Psi}_{K-1,l}\}$. The inner-loop analysis device is used to analyze the phase curves of all subcarriers and determine the inter-symbol phase average offset.

In an embodiment, the analyzing the phase curve of all subcarriers and determining the phase average offset can include performing fitting on the phase curve of all subcarriers and determining an intercept value of curve fitting, where the intercept value can be understood as the above-mentioned phase average offset.

Figure 3:
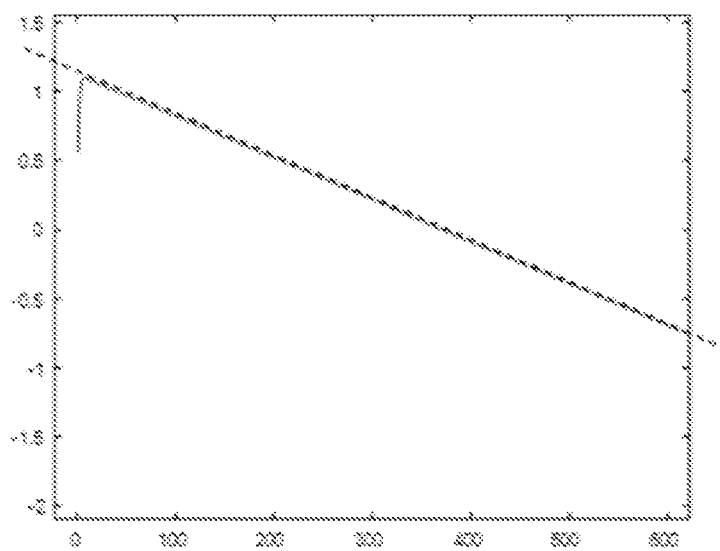
FIG. 3 is a schematic diagram of an analysis principle for a phase curve of subcarriers provided by an embodiment of the present disclosure.

FIG. 3 is a schematic diagram of an analysis principle for a phase curve of subcarriers provided by an embodiment of the present disclosure. As shown in FIG. 3, the abscissa is the subcarrier serial number, and the ordinate is the phase value. The solid line in FIG. 3 is the phase curve of subcarriers. The dotted line in FIG. 3 is a straight line obtained by linear analysis. After obtaining this straight line, the inter-symbol phase average offset can be determined, which is equivalent to determining the intercept value of the curve fitting.

The inter-symbol phase average offset is represented by $\hat{\varphi}_{in}^l$, and $\hat{\varphi}_{in}^l$ is used to characterize the estimated value of the difference obtained by subtracting the second value from the first value. The first value refers to the carrier phase value of the current OFDM symbol and the second value refers to the estimated value of the carrier phase of the previous OFDM symbol.

S103: performing time domain tracking by using the inter-symbol phase average offset as an input phase, and determining an estimated value of the carrier phase of the current OFDM symbol.

In an embodiment, after obtaining the inter-symbol phase average offset $\hat{\varphi}_{in}^l$, the time domain tracking is performed by using the inter-symbol phase average offset as the input phase, and the estimated value $\hat{\varphi}_l$ of the carrier phase of the current OFDM symbol is determined.

For example, the inter-symbol phase average offset is used as the input of the time domain PLL, the time domain tracking is performed through the time domain PLL, and the estimated value $\hat{\varphi}_l$ of the carrier phase of the current OFDM symbol is determined.

The time domain PLL device is also referred to as outer-loop PLL, or outer-loop for short. The time domain PLL device includes an outer-loop multiplier, an outer-loop filter and an outer-loop NCO.

After the input data $\hat{\varphi}_{in}^l$, is processed by the outer-loop filter, the processed input data enters the outer-loop NCO to output the estimated value $\hat{\varphi}_l$ of the carrier phase of the current OFDM symbol, where $\hat{\varphi}_l$ is obtained by accumulating the outputs of the outer-loop filter corresponding to the previous l OFDM symbols as the tracking phase of the outer-loop PLL output, and is used to correct the phase of the (l+1)th OFDM symbol.

The parameter $\alpha_t$ of the outer-loop filter can be configured as a fixed value.

It should be noted that for the same OFDM symbol, depending on the difference of the range and order of the data $c_k^l$ inputted to the inner-loop PLL, the carrier phase outputted by the outer-loop PLL is also different. The carrier phase outputted by the outer-loop PLL refers to the phase corresponding to the first subcarrier inputted to the inner-loop. Therefore, the overall structure of the double-loop PLL can be appropriately expanded as required. The entire PLL can be expanded into a structure having multiple parallel PLLs, which can output phase tracking results corresponding to multiple required subcarrier frequency points respectively.

In the carrier phase tracking method for the OFDM multi-carrier system provided by embodiments of the present disclosure, by using a double-loop structure with two nested PLLs, and inputting the output result of the frequency domain PLL after being analyzed and adjusted into the time domain PLL, phase changes in both the time domain and the frequency domain can be tracked and the accuracy of carrier phase tracking for OFDM symbols is improved.

Based on any of the above-mentioned embodiments, in an embodiment, the analyzing phase curve of all subcarriers and determining an inter-symbol phase average offset includes:
  analyzing the phase curve of all subcarriers in segments and determining a set of estimated values of inter-subcarrier phase change rate;
  performing cluster analysis on the set of estimated values of inter-subcarrier phase change rate and determining a category containing the largest number of elements;
  averaging elements in the category containing the largest number of elements and determining an inter-subcarrier phase change rate used for characterizing an estimated value of delay occurring in the current OFDM symbol; and
  determining the inter-symbol phase average offset according to the inter-subcarrier phase change rate.

In an embodiment, the analyzing the phase curve of all subcarriers in segments and determining a set of estimated value of inter-subcarrier phase change rate can include performing fitting on the phase curve of all subcarriers in segments and determining a set of estimated values of the curve slope. The curve slope here can be understood as the above-mentioned inter-subcarrier phase change rate.

In the embodiments of the present disclosure, after K frequency domain data are processed in the inner-loop, the phase output $\hat{\Psi}_l$ corresponding to each subcarrier can be obtained, where $\hat{\Psi}_l = \{\hat{\Psi}_{0,l}, \ldots, \hat{\Psi}_{K-1,l}\}$, and the phase output contains the delay information. The phase curve of $\hat{\Psi}_l$ is analyzed to obtain the estimated value $\Delta\hat{t}$ of the delay and the phase $\hat{\varphi}_{in}^l$, inputted to the outer loop from the inner-loop. For example, the analyzing process is shown as follow.

Firstly, the phase curve in the inner-loop is analyzed in segments (the segments can be overlapped) and a set of estimated values of inter-subcarrier phase change rate is obtained.

Secondly, cluster analysis is performed on the set of estimated values of inter-subcarrier phase change rate, and a radius e_dt for category is set according to the accuracy requirements, where e_dt is used to classify the set of estimated values of inter-subcarrier phase change rate to determine the category containing the largest number of elements.

Thirdly, the elements in the category containing the largest number of elements are averaged and the inter-subcarrier phase change rate is determined, where the inter-subcarrier phase change rate is used to characterize an estimated value $\Delta\hat{t}^l$ of delay occurring in the current OFDM symbol.

Finally, the inter-symbol phase average offset is determined according to the inter-subcarrier phase change rate. As shown in FIG. 3, the result obtained by analyzing the phase curve of all subcarriers in segments is a straight line, and the inter-symbol phase average offset can be determined after obtaining this straight line.

In the carrier phase tracking method for the OFDM multi-carrier system provided by embodiments of the present disclosure, by analyzing in segments and performing cluster analysis, the accuracy of estimating the inter-symbol phase average offset can be improved and the accuracy of carrier phase tracking of OFDM symbols can be further improved.

Based on any of the above-mentioned embodiments, in an embodiment, after the determining the estimated value of the carrier phase of the current OFDM symbol, the method further includes:
  adaptively adjusting a parameter value of a loop filter in a frequency domain PLL according to the estimated value of delay occurred in the current OFDM symbol.

In the embodiment of the present disclosure, considering the delay change caused by the propagation environment and user movement, the parameter $\alpha_f$ of the inner-loop filter can be adaptively adjusted during the phase tracking process.

The parameter value of the loop filter in the frequency domain phase locked loop (PLL) is adaptively adjusted according to the estimated value $\Delta\hat{t}^l$ of delay occurred in the current OFDM symbol.

Since the parameter $\alpha_f$ of the inner-loop filter changes slowly, the parameter of the inner-loop filter may be adjusted for each OFDM symbol, or the parameter of the inner-loop filter may be adjusted once every time OFDM symbols are processed.

The parameter $\alpha_f$ of the inner-loop filter can be adaptively adjusted according to a preset corresponding relationship. The corresponding relationship between the estimated value $\Delta\hat{t}$ of delay and the parameter $\alpha_f$ of the inner-loop filter can be as shown in table 1.

TABLE 1

Corresponding relationship between $\Delta\hat{t}$ and $\alpha_f$

| Estimated value $\Delta\hat{t}$ of delay | Value of $\alpha_f$ |
|---|---|
| <15 ns | 0.1 |
| 15-30 ns | 0.2 |
| 30-70 ns | 0.3 |
| 70-900 ns | 0.5 |
| 0.9-7 us | 0.85 |
| 7-9.6 us | 0.9 |
| >9.6 us | 0.98 |

In the carrier phase tracking method for the OFDM multi-carrier system provided by embodiments of the present disclosure, by adaptively adjusting the parameter of the inner-loop filter, the delay change caused by the propagation environment or user movement can be avoided and the accuracy of tracking carrier phase of OFDM symbols can be further improved.

Based on any of the above-mentioned embodiments, in an embodiment, after the determining the estimated value of the carrier phase of the current OFDM symbol, the method further includes:
  compensating the estimated value of the carrier phase of the current OFDM symbol according to a first fixed phase gap and a second fixed phase gap, where the first fixed phase gap is a phase gap generated by the frequency domain PLL which is used to perform frequency domain tracking on a received OFDM symbol, and the second fixed phase gap is a phase gap generated by the time domain PLL which is used to perform time domain tracking on an input phase.

In an embodiment of the present disclosure, both the inner-loop PLL and the outer-loop PLL are first-order PLL. Since there is a fixed phase gap when the linearly changing phase is estimated by first-order PLL, the value of the gap needs to be calculated and compensated on the output phase.

The fixed phase gap generated by the inner-loop PLL is represented by $gap_1$, the fixed phase gap generated by the outer-loop PLL is represented by $gap_2$, and the output phase of the outer-loop PLL is used as the input of the inner-loop PLL. Therefore, the value of $gap_2$ is associated with $gap_1$.

After both $gap_1$ and $gap_2$ are determined, the estimated value of the carrier phase of the current OFDM symbol can be compensated. The formula is expressed as follows:

$$\hat{\varphi}_l' = \hat{\varphi}_l + gap_2,$$

where $\hat{\varphi}_l'$ is the compensated carrier phase, $\hat{\varphi}_l$ is the estimated value of the carrier phase outputted by the outer-loop PLL, and $gap_2$ is the fixed phase gap generated by the outer-loop PLL.

In the carrier phase tracking method for the OFDM multi-carrier system provided by embodiments of the present disclosure, by compensating the estimated value of the carrier phase, the effect of the phase gap generated by the frequency domain PLL and the phase gap generated by the time domain PLL on the results can be avoided, and further the accuracy of tracking carrier phase of OFDM symbols can be improved.

Based on any of the above-mentioned embodiments, in an embodiment, before the compensating the estimated value of the carrier phase of the current OFDM symbol according to the first fixed phase gap and the second fixed phase gap, the method further includes:

determining the first fixed phase gap based on the parameter value of the loop filter in the frequency domain PLL, a subcarrier spacing, and the estimated value of delay occurred in the current OFDM symbol; and determining the second fixed phase gap based on the first fixed phase gap, the inter-symbol phase average offset, and the parameter value of the loop filter in the time domain PLL.

In an embodiment of the present disclosure, the first fixed phase gap is determined based on the parameter value of the loop filter in the frequency domain PLL, the subcarrier spacing, and the estimated value of delay occurring in the current OFDM symbol.

The second fixed phase gap is determined based on the first fixed phase gap, the inter-symbol phase average offset, and the parameter value of the loop filter in the time domain PLL.

In an embodiment, the steps of determining the first fixed phase gap or the second fixed phase gap are as follows.

The inner-loop PLL estimates the linear change of the frequency domain phase. In an ideal situation, after the inner-loop PLL is locked, the step amount of the output phase is the same as the phase change between adjacent subcarriers in the frequency domain, which is expressed by the formula as follows:

$$\alpha_f \varepsilon_{k,f} = 2\pi f_{scs} \Delta t.$$

where $\varepsilon_{k,f} = \Psi_{k,l} - \hat{\Psi}_{k-1,l}$ is the difference between the phase of the kth subcarrier outputted by the PED and the (k−1)th phase output from the inner-loop PLL. The fixed phase gap $gap_1$ in the inner-loop PLL is the difference between the phase of the kth subcarrier and the corresponding kth phase output from the inner-loop PLL, which is expressed by the formula as follows:

$$gap_1 = \Psi_{k,l} - \hat{\Psi}_{k,l} = \Psi_{k,l} - (\hat{\Psi}_{k-1,l} + \alpha_f \varepsilon_{k,f}) = (1-\alpha_f)\varepsilon_{k,f}$$

Combining the above two formulas, the expression of the fixed phase gap generated by the inner-loop PLL can be obtained by the formula as follows:

$$gap_1 = \frac{1-\alpha_f}{\alpha_f} * 2\pi f_{scs} \Delta t.$$

The outer loop estimates the phase change in the time domain, that is, $\alpha_t \hat{\varphi}_{in}^l$. $\hat{\varphi}_{in}^l = \varphi_l - \hat{\varphi}_{l-1}$ represents the difference between the phase of the lth OFDM symbol and the phase output corresponding to the (l−1)th symbol. Considering the existence of $gap_1$ of the inner-loop, $\varphi_{in}^l = \hat{\varphi}_{in}^l + gap_1$.

The fixed phase gap generated by the outer-loop PLL is the difference between the phase of the lth OFDM symbol and the corresponding lth phase output of the outer loop, which is expressed by the formula as follows:

$$gap_2 = \varphi_l - \hat{\varphi}_l = \varphi_l - (\hat{\varphi}_{l-1} + \alpha_t \hat{\varphi}_{in}^l) = \varphi_{in}^l - \alpha_t \hat{\varphi}_{in}^l = \hat{\varphi}_{in}^l + gap_1 - \alpha_t \hat{\varphi}_{in}^l.$$

From this, the fixed phase gap of the outer-loop PLL can be obtained and is expressed by the formula as follows:

$$gap_2 = (1-\alpha_t)\hat{\varphi}_{in}^l + gap_1.$$

In the carrier phase tracking method for OFDM multi-carrier system provided by embodiments of the present disclosure, by determining the phase gap generated by the frequency domain PLL according to the parameter value of the loop filter in the frequency domain PLL, the subcarrier spacing, and the estimated value of delay occurred in the current OFDM symbol, the determined phase gap generated by the frequency domain PLL is more accurate; by determining the phase gap generated by the time domain PLL according to the correlation between the frequency domain PLL and the time domain PLL, the determined phase gap generated by the time domain PLL is more accurate, and further the accuracy of tracking carrier phase of OFDM symbols is improved.

Based on any of the above-mentioned embodiments, in an embodiment, when applied to an OFDM multi-carrier system under a time division duplex (TDD) mode, after determining the estimated value of the carrier phase of the current OFDM symbol, the method further includes:

compensating the estimated value of the carrier phase of the current OFDM symbol according to an integer ambiguity change, where the integer ambiguity change is a difference obtained by subtracting an integer ambiguity of a downlink received signal of previous segment from an integer ambiguity of the downlink received signal of current segment, the downlink received signal of the current segment is a segment of downlink received signal including the current OFDM symbol.

In an embodiment of the present disclosure, since the received signal in time division duplex (TDD) mode is discontinuous, the phase estimation needs to be performed again every preset time duration. In an embodiment, the integer ambiguity change needs to be determined, and the estimated value of the carrier phase of the current OFDM symbol is compensated according to the integer ambiguity change. The integer ambiguity change is the difference obtained by subtracting the integer ambiguity of the downlink received signal of previous segment from the integer ambiguity of the downlink received signal of the current segment, the downlink received signal of the current segment is a segment of downlink received signal including the current OFDM symbol. The formula for compensating is expressed as follows:

$$\hat{\varphi}_l' = \hat{\varphi}_l + \Delta N \cdot 2\pi,$$

where $\hat{\varphi}_l'$ is the compensated carrier phase, $\hat{\varphi}_l$ is the estimated value of the carrier phase outputted by the outer-loop PLL, and $\Delta N$ is the integer ambiguity change.

In the carrier phase tracking method for OFDM multi-carrier system provided by embodiments of the present disclosure, by compensating the estimated value of the carrier phase of the current OFDM symbol using the integer ambiguity change for the case where the received signal is discontinuous in the TDD system, the accuracy of carrier phase tracking of OFDM symbols is improved.

Based on any of the above-mentioned embodiments, in an embodiment, before the compensating the estimated value of the carrier phase of the current OFDM symbol according to the integer ambiguity change, the method further includes:

performing linear estimation on a frequency offset of a target uplink transmitted signal based on a frequency offset estimated value of the current segment downlink received signal and a frequency offset estimated value of the previous segment downlink received signal, and determining a frequency offset estimated value of the target uplink transmitted signal, where the target uplink transmitted signal is an uplink transmitted signal at the interval between the current segment downlink received signal and the previous segment downlink received signal; and determining the integer ambiguity change according to the frequency offset estimated value of the target uplink transmitted signal.

In an embodiment, after continuous OFDM symbols enter the double-loop PLL structure, outer loop output phases $\{\hat{\varphi}_l | l=0, \ldots\}$ are obtained correspondingly, and the outer loop output phases include frequency offset information. The estimated value $\hat{\delta f}$ of the frequency offset can be obtained by calculating an average value $\overline{\Delta \varphi}$ of differences between the outer loop output phases of adjacent OFDM symbols, which can be expressed by the formula as follows:

$$\hat{\delta f} = \frac{\overline{\Delta \varphi}}{2\pi(N + N_{CP})} N f_{scs};$$

$\hat{\delta f}$ is the estimated value of the frequency offset, $\overline{\Delta \varphi}$ is the average value of differences between the outer loop output phases, N is the number of sampling points in one OFDM symbol, $N_{CP}$ is the length of cyclic prefix, and $f_{scs}$ is the subcarrier spacing.

In the embodiments of the present disclosure, by performing linear estimation on the frequency offset of the uplink signal at an interval between two segment adjacent downlink signals using the frequency offset estimated values of the two segment adjacent downlink signals, and calculating the variation amount of carrier phase within the interval uplink time (for example, 5 ms), an estimated integer ambiguity of downlink signals can be obtained.

In an embodiment, the steps of determining the integer ambiguity change $\Delta N$ are as follows.

Linear estimation is firstly performed on the frequency offset of the target uplink transmitted signal based on the frequency offset estimated value of the current segment downlink received signal and the frequency offset estimated value of the previous segment downlink received signal, and then an estimated value of the frequency offset of the target uplink transmitted signal is determined, where the target uplink transmitted signal is an uplink transmitted signal at the interval between the current segment downlink received signal and the previous segment downlink received signal.

Figure 4:
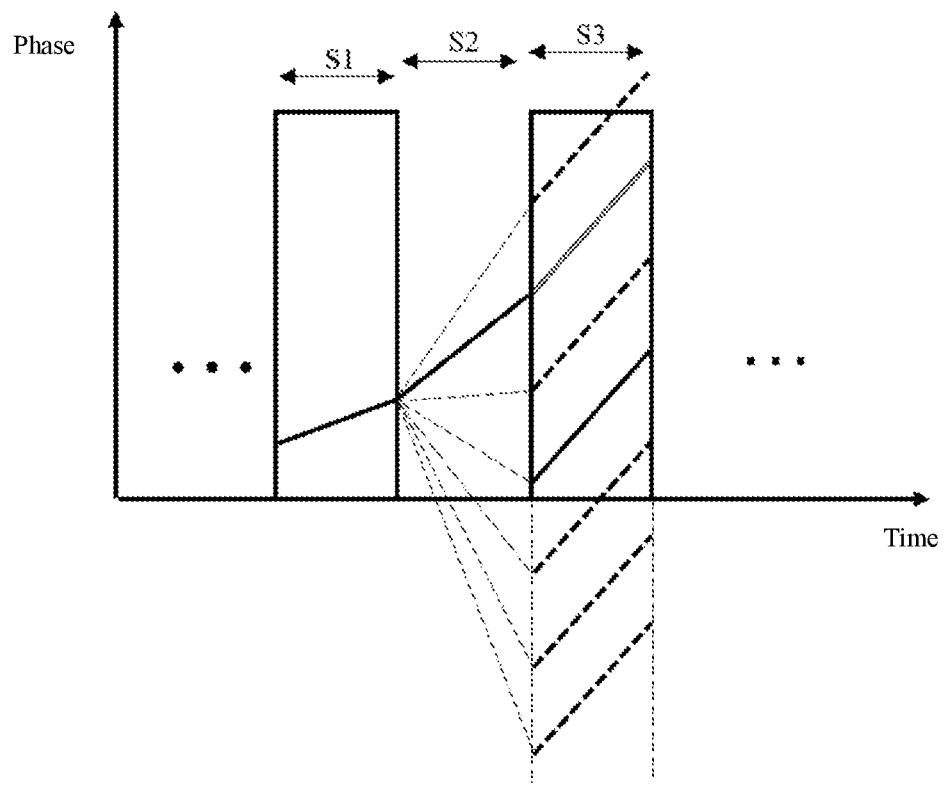
FIG. 4 is a schematic diagram of a principle for determining an integer ambiguity change provided by an embodiment of the present disclosure.

FIG. 4 is a schematic diagram of a principle for determining an integer ambiguity change provided by an embodiment of the present disclosure. As shown in FIG. 4, the two segments of received adjacent downlink signals are represented by s1 and s3, respectively. According to the output results of the outer-loop PLL, the estimated value of the carrier phase of the s1 segment is represented as a solid line segment in the FIG. 4, and the estimated value of the carrier phase of the s3 segment is represented as a solid line segment in the FIG. 4. The frequency offset estimated value of the s1 segment is $\hat{\delta f}_1$ and the frequency offset estimated value of the s3 segment is $\hat{\delta f}_3$, and the uplink signal within the time (the time length is determined by the system configuration, for example, 5 ms) between s1 and s3 segments is represented by s2. According to the empirical value in practical application, the upper and lower bounds of the possible frequency offset are respectively set as ±0.05, and the range of phase hopping that may occur within 5 ms (70 OFDM symbols) is ±28 rad (±0.05*70*2π(N+$N_{CP}$)/N), which is about 4.5 integer cycles. Therefore, the cycle slip variable that occurs in the s3 segment is limited to [−4, 4]. By shifting the estimated value of the carrier phase of the s3 segment (the solid line of the s3 segment in FIG. 4) upwards and downwards in units of $2\pi$, 9 parallel curves can be obtained, which are approximately straight line segments. In FIG. 4, only 7 lines are drawn in the s3 segment as an example. Assuming that the frequency offset of the uplink signal s2 segment remains unchanged, 9 estimated values of $\delta f_2$ can be obtained, and the one of the 9 estimated values that makes the variance of $\hat{\delta f}_1$, $\delta f_2$ and $\hat{\delta f}_3$ be smallest is selected as the estimated value of $\delta f_2$, and the mathematical expression is as follows:

$$\hat{\delta f}_2 = \underset{\delta \hat{f}_{2,i}}{\mathrm{argmin}} \sqrt{\left|\delta \hat{f}_1 - \delta \hat{f}_{2,i}\right|^2 + \left|\delta \hat{f}_3 - \delta \hat{f}_{2,i}\right|^2},$$

where i=1, ..., 9.

Then, the integer ambiguity change is determined according to the frequency offset estimated value of the target uplink transmitted signal.

As shown in FIG. 4, after the estimated value of $\delta f_2$ is determined, it can be determined that the s2 segment carrier phase estimated value curve is the solid line in FIG. 4 among 9 possible carrier phase estimated value curves (in FIG. 4, only 7 lines are drawn in the s2 segment as an example). Then, the double solid line in the s3 segment in FIG. 4 represents the carrier phase value of the s3 segment after compensating the integer ambiguity. The phase deviation of the s3 segment double solid line relative to the s3 segment solid line is divided by $2\pi$, and then the offset $\Delta N$ of integer ambiguity of the s3 segment relative to the s1 segment is obtained.

In the carrier phase tracking method for OFDM multi-carrier system provided by the embodiments of the present disclosure, by performing linear estimation on the frequency offset of the uplink signal at the interval using the frequency offset estimated values of the two segment adjacent downlink signals, and determining the integer ambiguity change according to the frequency offset estimated value of the uplink transmitted signal, the obtained integer ambiguity change is more accurate and the accuracy of tacking carrier phase of OFDM symbols is further improved.

Based on any of the above-mentioned embodiments, in an embodiment, when the method is applied to the OFDM multi-carrier system in TDD mode, after determining the estimated value of the carrier phase of the current OFDM symbol, the method further includes:

compensating the estimated value of the carrier phase of the current OFDM symbol according to the first fixed phase gap, the second fixed phase gap and the integer ambiguity change, where the first fixed phase gap is a phase gap generated by a frequency domain PLL, and the frequency domain PLL is used to perform frequency domain tracking on a received OFDM symbol; the second fixed phase gap is a phase gap generated by a time domain PLL, and the time domain PLL is used to perform time domain tracking on an input phase; and the integer ambiguity change is the difference obtained by subtracting an integer ambiguity of a previous segment downlink received signal from an integer ambiguity of a current segment downlink received signal, and the current segment downlink received signal is one segment downlink received signal including the current OFDM symbol.

In an embodiment of the present disclosure, since the received signal in time division duplex (TDD) mode is discontinuous, the phase estimation needs to be performed again every preset time duration and because there is a phase gap in the inner-loop PLL and the outer-loop PLL, the fixed phase gaps of the inner-loop PLL and the outer-loop PLL and the integer ambiguity change need to be determined, and then the estimated value of the carrier phase of the current OFDM symbol is compensated according to the fixed phase gaps of the inner-loop PLL and the outer-loop PLL and the integer ambiguity change. The integer ambiguity change is the difference obtained by subtracting the integer ambiguity of the previous segment downlink received signal from the integer ambiguity of the current segment downlink received signal, and the current segment downlink received signal is one segment downlink received signal including the current OFDM symbol. The formula for performing compensation is expressed as follows:

$$\hat{\varphi}_l' = \hat{\varphi}_l + gap_2 + \Delta N \cdot 2\pi;$$

where $\hat{\varphi}_l'$ is the carrier phase after compensation, $\hat{\varphi}_l$ is the estimated value of the carrier phase outputted by the outer-loop PLL, $gap_2$ is the fixed phase gap of the outer-loop PLL, where the value of the $gap_2$ is associated with $gap_1$, $gap_1$ is the fixed phase gap of the inner-loop PLL, and $\Delta N$ is the integer ambiguity change.

In the carrier phase tracking method for the OFDM multi-carrier system provided by the embodiments of the present disclosure, by compensating the estimated value of the carrier phase of the current OFDM symbol according to the fixed phase gap of the frequency domain PLL, the fixed phase gap of the time domain PLL and the integer ambiguity change, the compensating effect is improved and the accuracy of carrier phase tracking for OFDM symbols is further improved.

FIG. 2 is a schematic diagram of a carrier phase tracking apparatus for OFDM multi-carrier system provided by an embodiment of the present disclosure. As shown in FIG. 2, the carrier phase tracking apparatus for OFDM multi-carrier system provided by the embodiment of the present disclosure includes a frequency domain PLL device, an inner-loop analysis device and a time domain PLL device.

The frequency domain PLL device is used to perform frequency domain tracking on a received current OFDM symbol and determine a phase of each subcarrier. The inner-loop analysis device is used to analyze a phase curve of all subcarriers and determine an inter-symbol phase average offset, where the inter-symbol phase average offset is used to characterize an estimated value of a difference obtained by subtracting a second value from a first value, the first value is a carrier phase value of the current OFDM symbol, and the second value is an estimated value of a carrier phase of a previous OFDM symbol. The time domain PLL device is used to perform time domain tracking by using the inter-symbol phase average offset as an input phase and determine an estimated value of a carrier phase of the current OFDM symbol.

In an embodiment, the frequency domain PLL device includes an inner-loop multiplier, a phase error discriminator (PED), an inner-loop filter and an inner-loop numerical control oscillator (NCO).

After the input sample data $r_i^l$ of the current (lth) OFDM symbol is corrected by the output value of an outer-loop NCO, the corrected input sample data is converted into frequency domain data $c_k^l$ by the FFT operator, and enters the inner-loop PLL. $r_i^l$ represents the ith time domain sampling data in the lth OFDM symbol, where i=0, ..., N−1. $c_k^l$ represents the data carried on the kth subcarrier of the lth OFDM symbol after FFT, where k=0, ..., K−1.

After the frequency domain data $c_k^l$ is corrected by the output value of the inner-loop NCO, the corrected frequency domain data enter the PED. The corrected frequency domain data is processing by PED to output the phase gap $\varepsilon_{k,l}$, where $\varepsilon_{k,l}$ represents the phase gap between the kth subcarrier and the (k−1)th output of the inner-loop NCO, $\varepsilon_{k,l}$ is obtained by conjugate multiplication of the corrected frequency domain data and a known PRS sequence, and $\varepsilon_{k,l}$ remains unchanged when the phase of the inner-loop PLL is locked.

The phase gap $\varepsilon_{k,l}$ enters the inner-loop NCO after passing through the inner-loop filter. The inner-loop NCO outputs subcarrier phase $\hat{\Psi}_{k,l}$, where $\hat{\Psi}_{k,l}$ is obtained by accumulating the outputs of the inner-loop filter corresponding to the previous k subcarriers, and is used to correct the phase of the (k+1)th subcarrier. After the phase of the inner-loop PLL is locked, $\hat{\Psi}_{k,l}$ changes linearly with the increase of the number of subcarriers.

After K frequency domain data of one OFDM symbol are all processed by the frequency domain PLL, the phase output $\hat{\Psi}^l$ corresponding to each subcarrier can be obtained, where $\hat{\Psi}^l = \{\hat{\Psi}_{0,l}, \ldots, \hat{\Psi}_{K-1,l}\}$. The inner-loop analysis device is used to analyze the phase curve of all subcarriers and determine the inter-symbol phase average offset. The inter-symbol phase average offset is represented by $\hat{\varphi}_{in}^l$, and $\hat{\varphi}_{in}^l$ is used to characterize the estimated value of the difference obtained by subtracting the second value from the first value. The first value refers to the carrier phase value of the current OFDM symbol, and the second value refers to the estimated value of the carrier phase of the previous OFDM symbol.

After determining the inter-symbol phase average offset $\hat{\varphi}_{in}^l$, the time domain tracking is performed by using the inter-symbol phase average offset as the input phase, and the estimated value $\hat{\varphi}_l$ of the carrier phase of the current OFDM symbol is determined.

For example, the inter-symbol phase average offset is used as the input of the time domain PLL, the time domain tracking is performed through the time domain PLL, and the estimated value $\hat{\varphi}_l$ of the carrier phase of the current OFDM symbol is determined.

The time domain PLL device includes an outer-loop multiplier, an outer-loop filter, and an outer-loop NCO.

After the input data $\hat{\varphi}_{in}^l$ is processed by the outer-loop filter, the processed input data enters the outer-loop NCO to output the estimated value $\hat{\varphi}_l$ of the carrier phase of the current OFDM symbol, where $\hat{\varphi}_l$ is obtained by accumulating the outputs of the outer-loop filter corresponding to the previous l OFDM symbols as the tracking phase of the outer-loop PLL output, and is used to correct the phase of the (l+1)th OFDM symbol.

The carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for the OFDM multi-carrier system provided by embodiments of the present disclosure, by using a double-loop structure with two nested PLLs, and inputting the output result of the frequency domain PLL after being analyzed and adjusted into the time domain PLL, the phase changes in both the time domain and the frequency domain can be tracked respectively and the accuracy of carrier phase tracking for OFDM symbols is improved.

Based on any of the above-mentioned embodiments, in an embodiment, the inner-loop analysis device includes a segment analysis sub-device, a cluster sub-device, a delay estimation sub-device and a phase offset determination sub-device, where:

the segment analysis sub-device is used to analyze the phase curve of all subcarriers in segments and determine a set of estimated value of inter-subcarrier phase change rate;

the cluster sub-device is used to perform cluster analysis on the set of estimated value of inter-subcarrier phase change rate and determine a category containing the largest number of elements;

the delay estimation sub-device is used to average elements in the category containing the largest number of elements and determine an inter-subcarrier phase change rate, where the inter-subcarrier phase change rate is used to characterize an estimated value of delay occurring in the current OFDM symbol; and the phase offset determination sub-device is used to determine the inter-symbol phase average offset according to the inter-subcarrier phase change rate.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for the OFDM multi-carrier system provided by the embodiments of the present disclosure, by analyzing in sections and then performing cluster analysis, the estimation accuracy of the inter-symbol phase average offset is improved and the accuracy of carrier phase tracking for OFDM symbols is further improved.

Based on any of the above-mentioned embodiments, in an embodiment, the apparatus further includes a parameter adjustment device.

In an embodiment, the parameter adjustment device is used to adaptively adjust a parameter value of a loop filter in a frequency domain PLL according to the estimated value of delay occurring in the current OFDM symbol.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for the OFDM multi-carrier system provided by the embodiments of the present disclosure, by adaptively adjusting the parameter of the inner-loop filter, the delay change caused by the propagation environment or user movement is avoided and the accuracy of carrier phase tracking of OFDM symbols is further improved.

Based on any of the above-mentioned embodiments, in an embodiment, the apparatus further includes a first compensation device.

In an embodiment, the first compensation device is used to compensate the estimated value of the carrier phase of the current OFDM symbol according to a first fixed phase gap and a second fixed phase gap, where the first fixed phase gap is a phase gap generated by a frequency domain PLL, and the frequency domain PLL is used to perform frequency domain tracking on a received OFDM symbol; and the second fixed phase gap is a phase gap generated by a time domain PLL, and the time domain PLL is used to perform time domain tracking on an input phase.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for OFDM multi-carrier system provided by the embodiments of the present disclosure, by compensating the estimated value of the carrier phase, the effects of the phase gap generated by the frequency domain PLL and the phase gap generated by the time domain PLL on the results are avoided and the accuracy of carrier phase tracking for OFDM symbols is further improved.

Based on any of the above-mentioned embodiments, in an embodiment, the apparatus further includes a first fixed phase gap determination device and a second fixed phase gap determination device.

In an embodiment, the first fixed phase gap determination device is used to determine the first fixed phase gap based on a parameter value of a loop filter in the frequency domain PLL, a subcarrier spacing, and the estimated value of delay occurring in the current OFDM symbol; and the second fixed phase gap determination device is used to determine the second fixed phase gap based on the first fixed phase gap, the inter-symbol phase average offset, and a parameter value of a loop filter in the time domain PLL.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for OFDM multi-carrier system provided by the embodiments of the present disclosure, by determining the phase gap generated by the frequency domain PLL according to the parameter value of the loop filter in the frequency domain PLL, the subcarrier spacing, and the estimated value of delay occurring in the current OFDM symbol, the determined phase gap generated by the frequency domain PLL is more accurate; and by determining the phase gap generated by the time domain PLL according to the correlation between the frequency domain PLL and the time domain PLL, the determined phase gap generated by the time domain PLL is more accurate, and the accuracy of tracking carrier phase of OFDM symbols is further improved.

Based on any of the above-mentioned embodiments, in an embodiment, when the apparatus is applied to an OFDM multi-carrier system in the TDD mode, the apparatus further includes a second compensation device.

In an embodiment, the second compensation device is used to compensate the estimated value of the carrier phase of the current OFDM symbol according to an integer ambiguity change, where the integer ambiguity change is a difference obtained by subtracting an integer ambiguity of a previous segment downlink received signal from an integer ambiguity of a current segment downlink received signal, the current segment downlink received signal is a segment of downlink received signal including the current OFDM symbol.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for the OFDM multi-carrier system provided by the embodiments of the present disclosure, by compensating the estimated value of the carrier phase of the current OFDM symbol using the integer ambiguity change for the case where the received signal is discontinuous in the TDD system, the accuracy of carrier phase tracking for OFDM symbols is improved.

Based on any of the above-mentioned embodiments, in an embodiment, the apparatus further includes an uplink frequency offset estimation device and an integer ambiguity change determination device.

In an embodiment, the uplink frequency offset estimation device is used to perform linear estimation on a frequency offset of a target uplink transmitted signal based on a frequency offset estimated value of the current segment downlink received signal and a frequency offset estimated value of the previous downlink received signal, and determine a frequency offset estimated value of the target uplink transmitted signal, where the target uplink transmitted signal is an uplink transmitted signal at the interval between the current segment downlink received signal and the previous segment downlink received signal; and the integer ambiguity change determination device is used to determine the integer ambiguity change according to the frequency offset estimated value of the target uplink transmitted signal.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for the OFDM multi-carrier system provided by the embodiments of the present disclosure, by performing linear estimation on the frequency offset of the uplink signal at the interval using the frequency offset estimated values of the two segments of adjacent downlink signals, and determining the integer ambiguity change according to the frequency offset estimated value of the uplink transmitted signal, the obtained integer ambiguity change is more accurate and the accuracy of carrier phase tacking for OFDM symbols is further improved.

Based on any of the above-mentioned embodiments, in an embodiment, when the apparatus is applied to the OFDM multi-carrier system in the TDD mode, the apparatus further includes a third compensation device.

In an embodiment, the third compensation device is used to compensate the estimated value of the carrier phase of the current OFDM symbol according to the first fixed phase gap, the second fixed phase gap and the integer ambiguity change, where the first fixed phase gap is a phase gap generated by a frequency domain PLL, and the frequency domain PLL is used to perform frequency domain tracking on a received OFDM symbol; the second fixed phase gap is a phase gap generated by a time domain PLL, and the time domain PLL is used to perform time domain tracking on an input phase; and the integer ambiguity change is the difference obtained by subtracting an integer ambiguity of a previous segment downlink received signal from an integer ambiguity of a current segment downlink received signal, and the current segment downlink received signal is a segment of downlink received signal including the current OFDM symbol.

In an embodiment, the carrier phase tracking apparatus for the OFDM multi-carrier system provided by embodiments of the present disclosure is used to perform the method in the above corresponding embodiment. The steps of executing the method described in the above corresponding embodiment by the apparatus provided in the embodiments are the same as those in the above corresponding embodiment, and will not be repeated here.

In the carrier phase tracking apparatus for the OFDM multi-carrier system provided by the embodiments of the present disclosure, by compensating the estimated value of the carrier phase of the current OFDM symbol according to the fixed phase gap of the frequency domain PLL, the fixed phase gap of the time domain PLL and the integer ambiguity change, the compensating effect is improved and the accuracy of carrier phase tracking for OFDM symbols is further improved.

Figure 5:
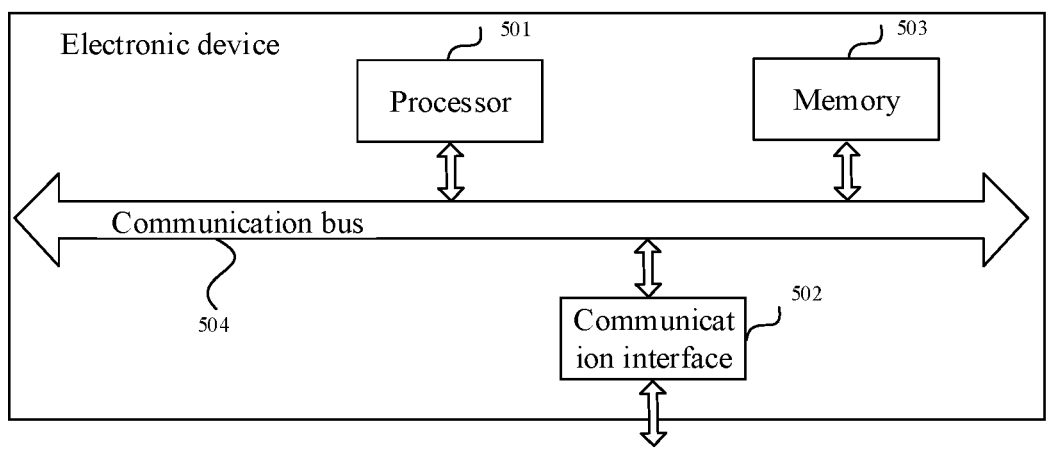
FIG. 5 is a schematic structural diagram of an electronic equipment provided by an embodiment of the present disclosure.

FIG. 5 is a schematic structural diagram of an electronic equipment provided by an embodiment of the present disclosure. As shown in FIG. 5, the electronic equipment includes: a processor 501, a communications interface 502, a memory 503, and a communication bus 504. The communications between the processor 501, the communication interface 502, and the memory 503 are realized through the communication bus 504. The processor 501 can call a computer program stored on the memory 503 and executable on the processor 501 to perform the following steps:

performing frequency domain tracking on a received current OFDM symbol and determining a phase of each subcarrier;

analyzing phase curve of all subcarriers and determining an inter-symbol phase average offset, where the inter-symbol phase average offset is used to characterize an estimated value of a difference obtained by subtracting a second value from a first value, the first value is a carrier phase value of the current OFDM symbol, and the second value is an estimated value of a carrier phase of a previous OFDM symbol; and performing time domain tracking by using the inter-symbol phase average offset as an input phase and determining an estimated value of a carrier phase of the current OFDM symbol.

In addition, when the above-mentioned logic instructions in the memory 503 can be implemented in the form of a software functional unit and sold or used as an independent product, it may be stored in a computer-readable storage medium. Based on this understanding, the solutions of the present disclosure in essence or the part of the solutions that contributes to the related art or part of the solutions can be embodied in the form of a software product, and the computer software product is stored in a storage medium, and includes several instructions to cause a computer device (which can be a personal computer, a server, or a network device or the like) to execute all or part of the steps of the methods described in the various embodiments of the present disclosure. The foregoing storage medium includes: USB flash memory, removable hard disk, read-only memory (ROM), random access memory (RAM), magnetic disk or optical disk and other mediums that can store program codes.

Embodiments of the present disclosure further provide a computer program product, where the computer program product includes a computer program stored on a non-transitory computer-readable storage medium, the computer program includes program instructions, and when the program instructions are executed by a computer, the computer can perform the steps in the above-mentioned method embodiments, including:

performing frequency domain tracking on a received current OFDM symbol and determining a phase of each subcarrier;

analyzing a phase curve of all subcarriers and determining an inter-symbol phase average offset, where the inter-symbol phase average offset is used to characterize an estimated value of a difference obtained by subtracting a second value from a first value, the first value is a carrier phase value of the current OFDM symbol, and the second value is an estimated value of a carrier phase of a previous OFDM symbol; and performing time domain tracking by using the inter-symbol phase average offset as an input phase and determining an estimated value of a carrier phase of the current OFDM symbol.

Embodiments of the present disclosure provide a non-transitory computer-readable storage medium having a computer program stored thereon, and the computer program, when executed by a processor, causes the processor to perform the steps in the above-mentioned method embodiments, including:

performing frequency domain tracking on a received current OFDM symbol and determining a phase of each subcarrier;

analyzing a phase curve of all subcarriers and determining an inter-symbol phase average offset, where the inter-symbol phase average offset is used to characterize an estimated value of a difference obtained by subtracting a second value from a first value, the first value is a carrier phase value of the current OFDM the symbol, and the second value is an estimated value of the carrier phase of a previous OFDM symbol; and performing time domain tracking by using the inter-symbol phase average offset as an input phase and determining an estimated value of a carrier phase of the current OFDM symbol.

The apparatus embodiments described above are only illustrative, where the units described as separate components may or may not be physically separated, and components displayed as units may or may not be physical units, that is, may be located in one place, or may be distributed to multiple network units. Part or all of the units may be selected according to actual needs to achieve the purpose of the solution in these embodiments.

From the description of the above embodiments, each embodiment can be implemented by means of software plus a necessary general hardware platform, and can also be implemented by hardware. Based on this understanding, the solutions of the present disclosure in essence or the part of the solutions that contributes to the related art can be embodied in the form of a software product, and the computer software products can be stored in computer-readable storage media, such as ROM/RAM, magnetic disk, optical disk or the like, including several instructions for causing a computer device (which can be a personal computer, a server, or a network device or the like) to perform the methods described in various embodiments or some parts of the embodiments.

What is claimed is:

1. A carrier phase tracking method for an orthogonal frequency division multiplexing (OFDM) multi-carrier system, comprising:

performing frequency domain tracking on a received current OFDM symbol and determining a phase of each subcarrier;

analyzing a phase curve of all subcarriers and determining an inter-symbol phase average offset, wherein the inter-symbol phase average offset is used to characterize an estimated value of a difference obtained by subtracting a second value from a first value, the first value is a carrier phase value of the current OFDM symbol, and the second value is an estimated value of a carrier phase of a previous OFDM symbol; and performing time domain tracking by using the inter-symbol phase average offset as an input phase and determining an estimated value of a carrier phase of the current OFDM symbol, wherein after determining the estimated value of the carrier phase of the current OFDM symbol, the method further comprises:

compensating the estimated value of the carrier phase of the current OFDM symbol according to a first fixed phase gap and a second fixed phase gap, wherein the first fixed phase gap is a phase gap generated by a frequency domain phase locked loop (PLL), and the frequency domain PLL is used to perform frequency domain tracking on a received OFDM symbol; and the second fixed phase gap is a phase gap generated by a time domain PLL, and the time domain PLL is used to perform time domain tracking on an input phase; or wherein when the method is applied to an OFDM multi-carrier system in a time division duplex (TDD) mode, after determining the estimated value of the carrier phase of the current OFDM symbol, the method further comprises:

compensating the estimated value of the carrier phase of the current OFDM symbol according to an integer ambiguity change, wherein the integer ambiguity change is a difference obtained by subtracting an integer ambiguity of a previous segment downlink received signal from an integer ambiguity of a current segment downlink received signal, and the current segment downlink received signal is a segment of downlink received signal comprising the current OFDM symbol; or wherein when the method is applied to an OFDM multi-carrier system in the TDD mode, after the determining the estimated value of the carrier phase of the current OFDM symbol, the method further comprises:

compensating the estimated value of the carrier phase of the current OFDM symbol according to a first fixed phase gap, a second fixed phase gap and an integer ambiguity change, wherein the first fixed phase gap is a phase gap generated by a frequency domain PLL, and the frequency domain PLL is used to perform frequency domain tracking on a received OFDM symbol; the second fixed phase gap is a phase gap generated by a time domain PLL, and the time domain PLL is used to perform time domain tracking on an input phase; and the integer ambiguity change is a difference obtained by subtracting an integer ambiguity of a previous segment downlink received signal from an integer ambiguity of a current segment downlink received signal, and the current segment downlink received signal is a segment of downlink received signal comprising the current OFDM symbol.

2. The method of claim 1, wherein the analyzing the phase curve of all subcarriers and determining the inter-symbol phase average offset, comprises:

analyzing the phase curve of all subcarriers in segments and determining a set of estimated value of inter-subcarrier phase change rate;

performing cluster analysis on the set of estimated value of inter-subcarrier phase change rate and determining a category containing the largest number of elements;

averaging elements in the category containing the largest number of elements and determining an inter-subcarrier phase change rate, wherein the inter-subcarrier phase change rate is used to characterize an estimated value of delay occurring in the current OFDM symbol; and determining the inter-symbol phase average offset according to the inter-subcarrier phase change rate.

3. The method of claim 1, wherein after determining the estimated value of the carrier phase of the current OFDM symbol, the method further comprises:

adaptively adjusting a parameter value of a loop filter in a frequency domain phase locked loop (PLL) according to an estimated value of delay occurring in the current OFDM symbol.

4. The method of claim 1, wherein before the compensating the estimated value of the carrier phase of the current OFDM symbol according to the first fixed phase gap and the second fixed phase gap, the method further comprises:

determining the first fixed phase gap based on a parameter value of a loop filter in the frequency domain PLL, a subcarrier spacing, and the estimated value of delay occurring in the current OFDM symbol; and determining the second fixed phase gap based on the first fixed phase gap, the inter-symbol phase average offset, and a parameter value of a loop filter in the time domain PLL.

5. The method of claim 1, wherein before the compensating the estimated value of the carrier phase of the current OFDM symbol according to the integer ambiguity change, the method further comprises:

performing linear estimation on a frequency offset of a target uplink transmitted signal based on a frequency offset estimated value of the current segment downlink received signal and a frequency offset estimated value of the previous segment downlink received signal, and determining a frequency offset estimated value of the target uplink transmitted signal, wherein the target uplink transmitted signal is an uplink transmitted signal at an interval between the current segment downlink received signal and the previous segment downlink received signal; and determining the integer ambiguity change according to the frequency offset estimated value of the target uplink transmitted signal.

6. An electronic device, comprising a processor and a memory storing a computer program that is executable on the processor, the computer program, when executed by the processor, causes the processor to perform the following steps:

performing frequency domain tracking on a received current orthogonal frequency division multiplexing (OFDM) symbol and determining a phase of each subcarrier;

analyzing a phase curve of all subcarriers and determining an inter-symbol phase average offset, wherein the inter-symbol phase average offset is used to characterize an estimated value of a difference obtained by subtracting a second value from a first value, the first value is a carrier phase value of the current OFDM symbol, and the second value is an estimated value of a carrier phase of a previous OFDM symbol; and performing time domain tracking by using the inter-symbol phase average offset as an input phase and determining an estimated value of a carrier phase of the current OFDM symbol, wherein after determining the estimated value of the carrier phase of the current OFDM symbol, the computer program, when executed by the processor, causes the processor to further perform the steps of:

compensating the estimated value of the carrier phase of the current OFDM symbol according to a first fixed phase gap and a second fixed phase gap, wherein the first fixed phase gap is a phase gap generated by a frequency domain phase locked loop (PLL), and the frequency domain PLL is used to perform frequency domain tracking on a received OFDM symbol; and the second fixed phase gap is a phase gap generated by a time domain PLL, and the time domain PLL is used to perform time domain tracking on an input phase; or wherein when the electronic device is applied to an OFDM multi-carrier system in a time division duplex (TDD) mode, after determining the estimated value of the carrier phase of the current OFDM symbol, the computer program, when executed by the processor, causes the processor to further perform the steps of:

compensating the estimated value of the carrier phase of the current OFDM symbol according to an integer ambiguity change, wherein the integer ambiguity change is a difference obtained by subtracting an integer ambiguity of a previous segment downlink received signal from an integer ambiguity of a current segment downlink received signal, and the current segment downlink received signal is a segment of downlink received signal comprising the current OFDM symbol; or wherein when the electronic device is applied to an OFDM multi-carrier system in the TDD mode, after the determining the estimated value of the carrier phase of the current OFDM symbol, the computer program, when executed by the processor, causes the processor to further perform the steps of:
compensating the estimated value of the carrier phase of the current OFDM symbol according to a first fixed phase gap, a second fixed phase gap and an integer ambiguity change, wherein the first fixed phase gap is a phase gap generated by a frequency domain PLL, and the frequency domain PLL is used to perform frequency domain tracking on a received OFDM symbol; the second fixed phase gap is a phase gap generated by a time domain PLL, and the time domain PLL is used to perform time domain tracking on an input phase; and the integer ambiguity change is a difference obtained by subtracting an integer ambiguity of a previous segment downlink received signal from an integer ambiguity of a current segment downlink received signal, and the current segment downlink received signal is a segment of downlink received signal comprising the current OFDM symbol.

7. The electronic device of claim 6, wherein the analyzing the phase curve of all subcarriers and determining the inter-symbol phase average offset, comprises:
analyzing the phase curve of all subcarriers in segments and determining a set of estimated value of inter-subcarrier phase change rate;
performing cluster analysis on the set of estimated value of inter-subcarrier phase change rate and determining a category containing the largest number of elements;
averaging elements in the category containing the largest number of elements and determining an inter-subcarrier phase change rate, wherein the inter-subcarrier phase change rate is used to characterize an estimated value of delay occurring in the current OFDM symbol; and
determining the inter-symbol phase average offset according to the inter-subcarrier phase change rate.

8. The electronic device of claim 6, wherein after determining the estimated value of the carrier phase of the current OFDM symbol, the computer program, when executed by the processor, causes the processor to further perform the steps of:
adaptively adjusting a parameter value of a loop filter in a frequency domain phase locked loop (PLL) according to an estimated value of delay occurring in the current OFDM symbol.

9. The electronic device of claim 6, wherein before the compensating the estimated value of the carrier phase of the current OFDM symbol according to the first fixed phase gap and the second fixed phase gap, the computer program, when executed by the processor, causes the processor to further perform the steps of:
determining the first fixed phase gap based on a parameter value of a loop filter in the frequency domain PLL, a subcarrier spacing, and the estimated value of delay occurring in the current OFDM symbol; and
determining the second fixed phase gap based on the first fixed phase gap, the inter-symbol phase average offset, and a parameter value of a loop filter in the time domain PLL.

10. The electronic device of claim 6, wherein before the compensating the estimated value of the carrier phase of the current OFDM symbol according to the integer ambiguity change, the computer program, when executed by the processor, causes the processor to further perform the steps of:
performing linear estimation on a frequency offset of a target uplink transmitted signal based on a frequency offset estimated value of the current segment downlink received signal and a frequency offset estimated value of the previous segment downlink received signal, and determining a frequency offset estimated value of the target uplink transmitted signal, wherein the target uplink transmitted signal is an uplink transmitted signal at an interval between the current segment downlink received signal and the previous segment downlink received signal; and
determining the integer ambiguity change according to the frequency offset estimated value of the target uplink transmitted signal.

* * * * *